(12) United States Patent
Kim

(10) Patent No.: US 7,164,135 B2
(45) Date of Patent: Jan. 16, 2007

(54) IMAGE INTENSIFIER CAMERA

(76) Inventor: Hoo-Shik Kim, 701-304 Salgugol Jindoek Apt., 988-2 Yeongtong-dong, Paldal-gu, Suwon-si, Gyeonggi-do, 442-470 (KR)

( * ) Notice: Subject to any disclaimer, the term of this patent is extended or adjusted under 35 U.S.C. 154(b) by 287 days.

(21) Appl. No.: 10/509,208

(22) PCT Filed: Mar. 6, 2003

(86) PCT No.: PCT/KR03/00430

§ 371 (c)(1),
(2), (4) Date: Sep. 23, 2004

(87) PCT Pub. No.: WO03/083576

PCT Pub. Date: Oct. 9, 2003

(65) Prior Publication Data

US 2005/0117702 A1    Jun. 2, 2005

(30) Foreign Application Priority Data

Mar. 29, 2002  (KR) ...................... 10-2002-0017438

(51) Int. Cl.
*G03B 42/02* (2006.01)
(52) U.S. Cl. ............... 250/370.08; 378/98.12
(58) Field of Classification Search ........... 250/370.08; 378/98.12
See application file for complete search history.

(56) References Cited

U.S. PATENT DOCUMENTS

| | | | | |
|---|---|---|---|---|
| 4,175,825 A | * | 11/1979 | Koppensteiner | ............ 313/524 |
| 4,636,044 A | * | 1/1987 | Loy | ............ 359/401 |
| 5,790,629 A | | 8/1998 | Svensson et al. | |
| 5,920,426 A | * | 7/1999 | Neil | ............ 359/428 |
| 6,124,986 A | * | 9/2000 | Sekita et al. | ............ 359/691 |
| 6,226,351 B1 | | 5/2001 | Snoeren et al. | |
| 6,268,904 B1 | | 7/2001 | Mori et al. | |
| 6,480,681 B1 | * | 11/2002 | Neil | ............ 396/373 |
| 2003/0206352 A1 | * | 11/2003 | Mihara et al. | ............ 359/684 |

* cited by examiner

*Primary Examiner*—Otilia Gabor
(74) *Attorney, Agent, or Firm*—Marger Johnson & McCollom, P.C.

(57) ABSTRACT

Disclosed is an image intensifier camera capable of rotating an image imaged therein. An image intensifier camera in accordance with the present invention includes an image inverse prism provided between a front lens group and an aperture stop in a fluoroscopic image imaging optical system, and an image pickup device in the intensifier camera of the present invention contains an electric circuit for converting a mirror image back to an original image therein. In accordance with the present invention, the image imaged in the image pickup device may be rotated by a rotatable image inverse prism, so that the image intensifier camera of the present invention has a simple structure, a small volume, high image resolution, and high stability of image quality.

6 Claims, 3 Drawing Sheets

(1)

(2)

A=1.00    n=1.5170    Q=22°30'    Ø=45°    W=67°30'    M=112°30'    a=0.2071A=0.2071
B=1.0824A=1.0824    C=1.2071A=1.2071    D=1.7071A=1.7071    E=1.8284A=1.8284
t=4.6213A=4.6213    t/n=3.0464

(3)

IMAGE INTENSIFIER CAMERA

This application claims the priority of PCT KR03/00430, filed on Mar. 6, 2003 and 2002-17438, filed on Mar. 29, 2002 in the Korean Intellectual Property Office, the disclosures of which are incorporated herein in their entirety by reference.

BACKGROUND OF THE INVENTION

1. Technical Field

The present invention relates to an image intensifier camera, and more particularly to an x-ray image intensifier camera capable of rotating an image imaged therein.

2. Background Art

An x-ray image intensifier camera has been widely used in industrial, medical and clinical fields. Such an x-ray Image intensifier camera is an apparatus for continuously radiating x-ray beams emitted from an x-ray generator onto an object to be examined and displaying the result of the x-ray radiation on a monitor.

An x-ray image intensifier camera system comprises an x-ray generator, an image intensifier tube, and an image intensifier camera. The x-ray beams emitted from the x-ray generator are transmitted through an object to be examined, are incident onto an input window of the image intensifier tube and then are output from an output window of the image intensifier tube. The x-ray beams emitted from the output window of the image intensifier tube are imaged to produce an image in the image intensifier camera, and then the image is converted into electrical signals. The electrical signals produced in the image intensifier camera are input to an electrical signal processing unit, such as a computer, and then displayed on a monitor as an intensified fluoroscopic image.

FIG. 1 illustrates an image intensifier camera, in accordance with the conventional art.

Referring to FIG. 1, an image intensifier camera comprises a fluoroscopic image imaging optical system, an image pickup device 32, and a signal processing circuit 40 which are arranged in order from an output window 11 of an image intensifier tube. The fluoroscopic image imaging optical system includes a front lens group 21, an aperture stop 22, and a rear lens group 23. The fluoroscopic image imaging optical system further includes an output window protective window 12, placed between the output window 11 of the image intensifier tube and the front lens group 21, and an input window protective window 31, placed between the rear lens group 23 and the image pickup device 32.

To rotate a fluoroscopic image imaged in the image intensifier camera by a certain angle, the image pickup device 32 or the entire structure of the image intensifier camera should be rotated with respect to the image intensifier tube. In the case of rotating the entire structure of the image intensifier camera, the structure of the camera becomes complicated and unstable. In the case of rotating only the image pickup device 32, a disc type slip ring is required so electrical wires connected to the image pickup device 32 do not get twisted but maintain good electrical connections with the image pickup device 32. However, using a slip ring is disadvantageous in terms of low solidity and instability in electrical connections in comparison with a soldering method. Further, a slip ring is disadvantageous in that it tends to generate signal noise.

DISCLOSURE OF THE INVENTION

Therefore, the present invention has been made in view of the above problems, and it is an object of the present invention to provide an image intensifier camera capable of easily rotating an image formed therein.

In accordance with the present invention, the above and other objects can be accomplished by the provision of an image intensifier camera comprising a fluoroscopic image imaging optical system including a front lens group, an aperture stop, and a rear lens group, an image pickup device, and a signal processing circuit, wherein the fluoroscopic image imaging optical system further includes an image inverse prism which is rotatably installed between the front lens group and the rear lens group, reflects incident light beams incident thereto a plurality of times, and outputs a mirror image by rotating an original image and inversing the left and right sides of the original image or the rotated original image.

Preferably, the image pickup device has an electric circuit for converting the mirror image back to the original image.

Preferably, the image inverse prism is a Pechan prism.

Preferably, an input window and an output window of the image inverse prism are planes perpendicular to an optical axis.

Preferably, in the fluoroscopic image imaging optical system, the front lens group and the rear lens group are distanced from each other to have an optical path length the same as the cumulative optical path lengths of the Pechan prism there between.

Preferably, the Pechan prism has refractivity higher than 1.7.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
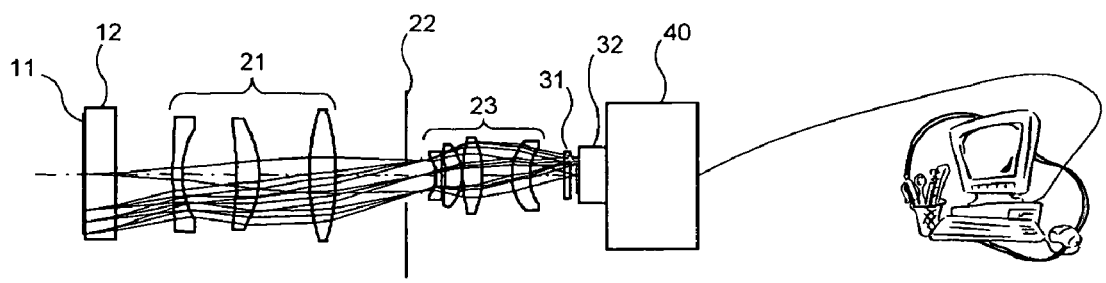
FIG. 1 illustrates a schematic view of an image intensifier camera in accordance with the conventional art.

A detailed description of an image intensifier camera in accordance with a preferred embodiment of the present invention will be given below with reference to the accompanying drawings. In drawings, thin solid lines and arrows denote directions of light beams.

FIG. 2 illustrates a schematic view of an image intensifier camera in accordance with a preferred embodiment of the present invention.

Referring to FIG. 2, an image intensifier camera in accordance with a preferred embodiment of the present invention comprises a fluoroscopic image imaging optical system placed on an optical path, an image pickup device 32, and a signal processing circuit 40.

The fluoroscopic image imaging optical system comprises a front lens group 21, an image inverse prism 50, and a rear lens group 23 which are arranged in order from an output window 12 of an image intensifier tube of a fluoroscopic image intensifier camera system. The fluoroscopic image imaging optical system has a positive refractivity.

The image inverse prism 50 is rotatably installed between the front lens group 21 and the rear lens group 23 to reflect light beams incident thereto a plurality of times, so as to allow an original image imaged in the image pickup device 32 to be rotated and for a mirror image of the original image to be formed. The rotatable image inverse prism 50 can form a mirror image as well as a rotated mirror image that is a left and light inversed image of a rotated original image. In the preferred embodiment of the present invention, the image inverse prism is a Pechan prism that reflects light beams five times. On the other hand, since the mirror inverse prism 50 outputs the mirror image, the image pickup device 32 contains an electric circuit for converting the mirror image back to the original image.

Figure 2A:
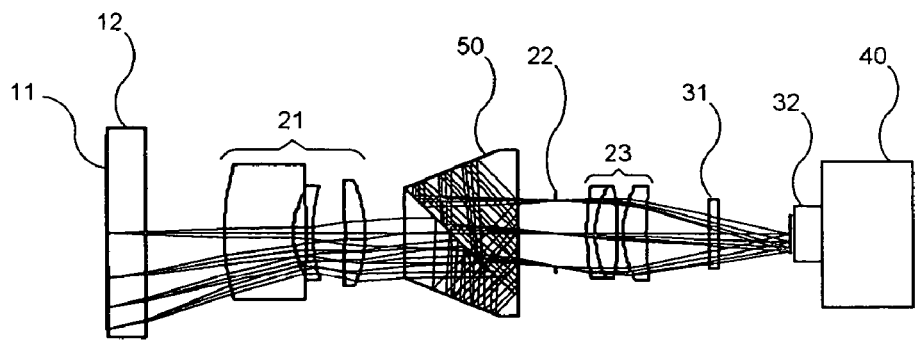
FIG. 2A illustrates a schematic view of an image intensifier camera in accordance with the present invention.
Figure 2B:
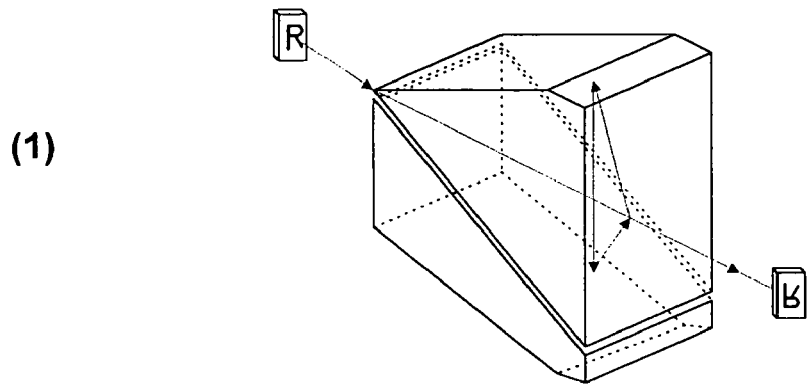
FIG. 2B illustrates a perspective view, side views, a top view, accumulative optical path length of a Pechan prism included in the image intensifier camera shown in FIG. 2A.
Figure 2B:
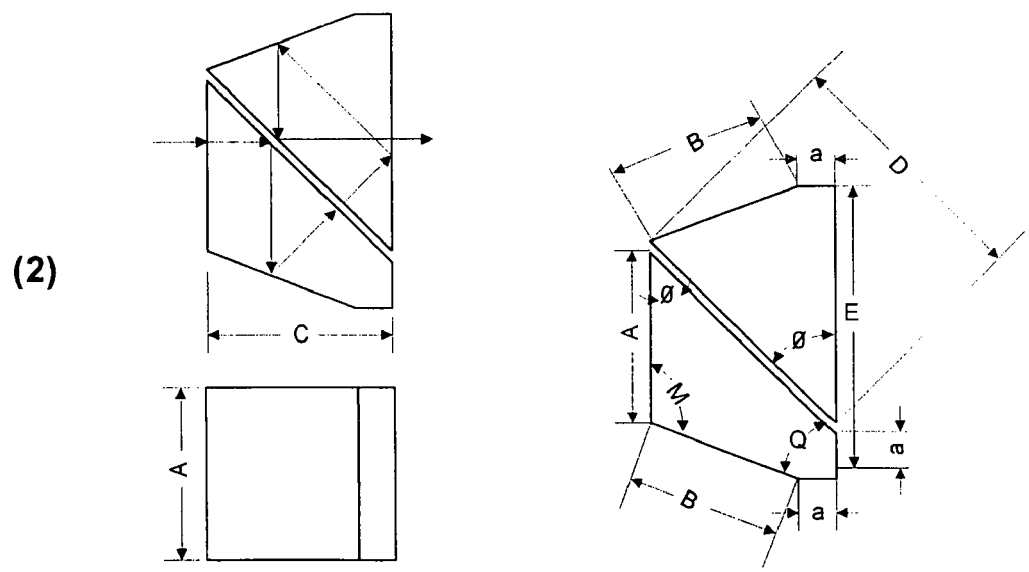
Figure 2B:
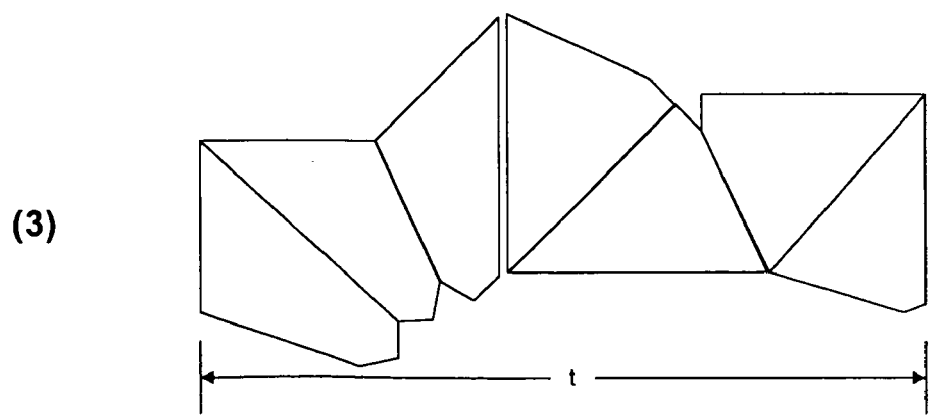
Figure 2C:
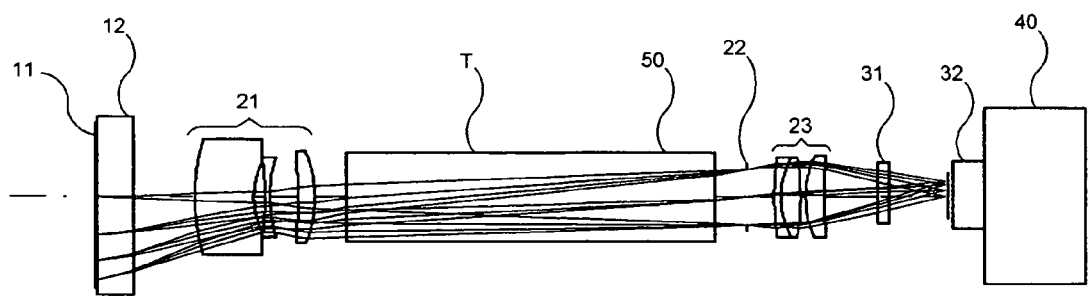
FIG. 2C illustrates a schematic view of an image intensifier camera in which all the elements excepting a Pechan prism are the same as the image intensifier camera shown in FIG. 2A, and the Pechan prism is replaced with an optical system having the same optical path length as the Pechan prism.

FIG. 2B illustrates an example of the Pechan prism, and FIG. 2C illustrates two side views, a top view of the Pechan prism and a schematic view of a cumulative optical path length of the Pechan prism.

Referring to FIG. 2B, assuming that a length of a side of a square of the Pechan prism is "A", the cumulative optical path length t of the Pechan prism is about 4.6213A.

Since optical path lengths are cumulated in the Pechan prism, the front lens group 21 and the rear lens group 23 are separated from each other by a distance to have an optical path length T the same as the cumulative optical path lengths of the Pechan prism there between, so as for a high resolution image to be imaged in the image pickup device 32.

The reason that the optical path length T between the front lens group 21 and the rear lens group 23 should be the same as the cumulative optical path length of the Pechan prism is because that in the case of testing an image intensifier camera in which a Pechan prism is included in the fluoroscopic image imaging optical system, error caused by the image intensifier camera equals the total value of errors caused by the front lens group 21, the rear lens group 23 and the Pechan prism. Accordingly, it is difficult to determine which part of the image intensifier camera causes what degree of error. Accordingly, for the image intensifier camera, the Pechan prism is separately tested from other parts of the image intensifier camera and any error detected in the test are corrected by correcting the Pechan prism. The other parts of the image intensifier camera are tested under a situation in which the Pechan prism is replaced with a different optical system having the same material as the Pechan prism and an optical path length the same as the cumulative optical path length of the Pechan prism between the front lens group 21 and the rear lens group 23. Then, any errors detected in the test are corrected by adjusting the lenses in the other parts of the image intensifier camera. After completing the testing and correction of the Pechan prism and the lenses, the adjusted lenses are combined with the corrected Pechan prism so that the image intensifier camera operates stably.

Here, the substituted optical system provided between the front lens group 21 and the rear lens group 23 to replace the Pechan prism is required to have a length 4.5 times greater than a maximum diameter of the aperture stop 22. Further, to minimize the optical path length of the substituted optical system, since the optical path length of the substituted optical system is about 4.6213A/refractivity of the Pechan prism, it is preferable that the refractivity of the Pechan prism is high. Actually, in designing an optical system, when the refractivity is greater than 1.7, effective aberration correction is possible.

Further, it is preferable that faces of the image inverse prism 50, which face an object to be examined, have a plane shape. The faces include an input face or an input window and an output face or an output window, which is preferably the top surface of the image inverse prism 50. Further, it is preferable that the Pechan prism is installed in such a manner that the input window and the output window of the Pechan prism are arranged to be perpendicular with respect to an optical axis.

Further, it is preferable that light beams are substantially perpendicularly incident onto the input window of the image inverse prism 50. To limit sizes of the input window and the output window of the image inverse prism, in the case that a size of an object to be examined is greater than that of an image imaged in the image pickup device 32, the aperture stop 22 is placed between the image reverse prism 50 and the image (or the image pickup device 32), the front lens group has a negative refractivity and the rear lens group has a positive refractivity. Further, in the case that the object to be examined is smaller than the image, the aperture stop 22 is placed between the image inverse prism 50 and the object to be examined, the front lens group 21 has a positive refractivity and the rear lens group 23 has a negative refractivity.

INDUSTRIAL APPLICABILITY

As apparent from the above description, the present invention provides an image intensifier camera in which an image inverse prism is installed on an optical path to rotate an image formed therein, so that a structure of the image intensifier camera becomes simpler, a volume of the image intensifier camera is reduced, an image produced by the image intensifier camera can be easily rotated, and an image quality is stabilized and improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An image intensifier camera comprising:
    a fluoroscopic image imaging optical system including a front lens group, an aperture stop, and a rear lens group;
    an image pickup device; and
    a signal processing circuit,
    wherein the fluoroscopic image imaging optical system further includes an image inverse prism, which is a Pechan prism, and which is rotatably installed between the front lens group and the rear lens group, reflects incident light beams incident thereto a plurality of times, and outputs a mirror image by rotating an original image and inversing the left and right sides of the original image or the rotated original image,
    and wherein in the fluoroscopic image imaging optical system, the front lens group and the rear lens group are distanced from each other to have an optical path length equal to a cumulative optical path length of the Pechan prism there between.

2. The image intensifier camera as set forth in claim 1, wherein the image pickup device has an electric circuit for converting the mirror image back to the original image.

3. The image intensifier camera as set forth in claim 1, wherein an input window and an output window of the image inverse prism are planes perpendicular to an optical axis.

4. The image intensifier camera as set forth in claim 1, wherein the Pechan prism has a refractivity higher than 1.7.

5. The image intensifier camera as set forth in claim 1, wherein the aperture stop is provided between the image inverse prism and the image, the front lens system has a negative refractivity and the rear lens system has a positive refractivity if the object to be examined is greater than the image in size.

6. The image intensifier camera as set forth in claim 1, wherein the aperture stop is provided between the image inverse prism and an object to be examined, the front lens system has a positive refractivity and the rear lens system has a negative refractivity if the object to be examined is smaller than the image in size.

* * * * *